Oct. 5, 1965
C. RICK
3,209,527
SPRING-TINE RAKE
Filed March 21, 1963
2 Sheets-Sheet 1
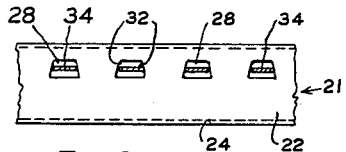
Fig. 2
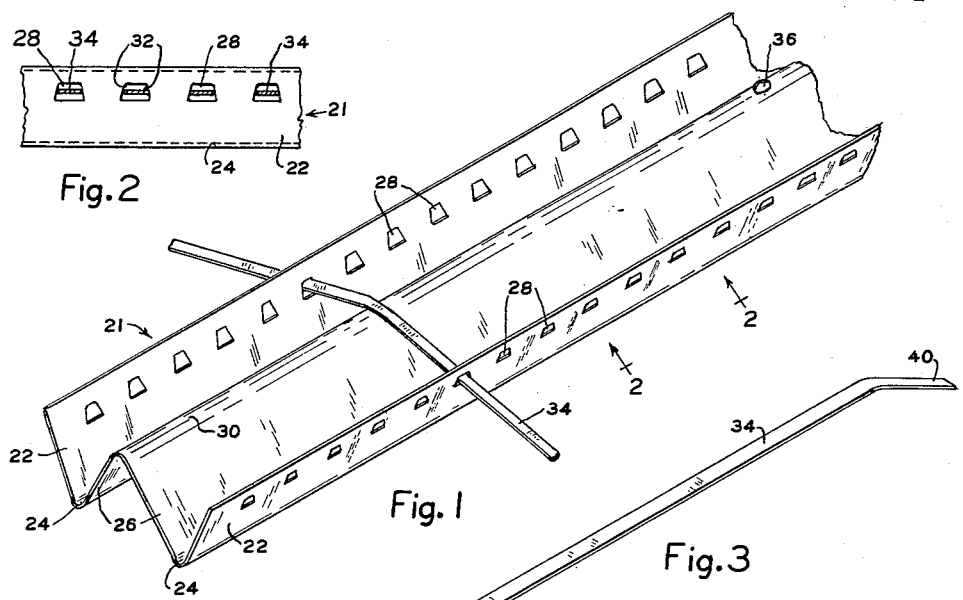
Fig. 1
Fig. 3
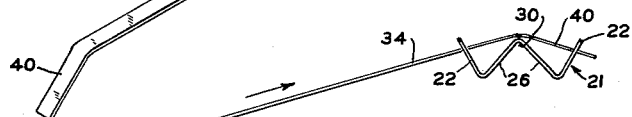
Fig. 4
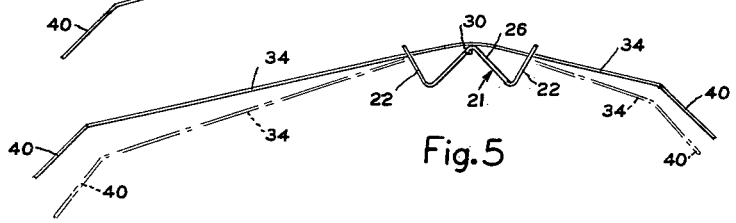
Fig. 5
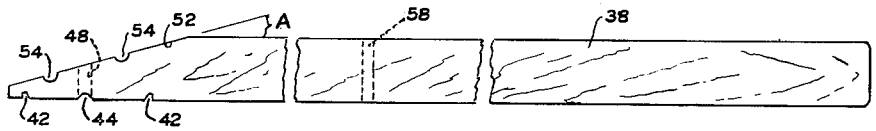
Fig. 6
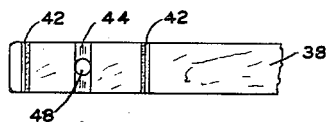
Fig. 7
INVENTOR.
CHESTER RICK
BY *Robert Irving Williams*
ATTORNEY Oct. 5, 1965 C. RICK 3,209,527
SPRING-TINE RAKE
Filed March 21, 1963 2 Sheets-Sheet 2
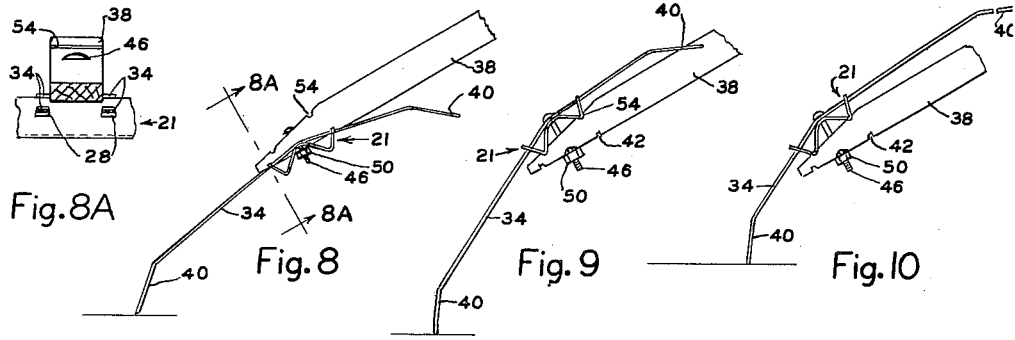
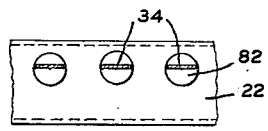
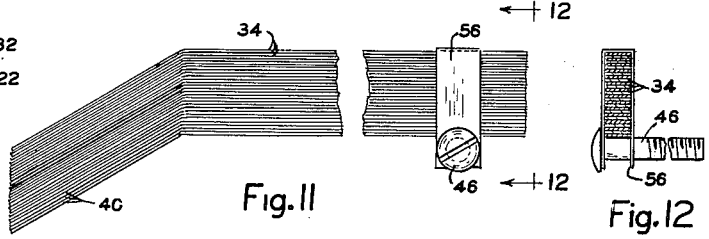
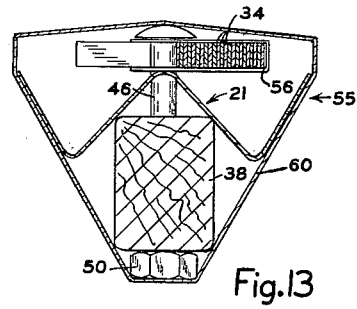
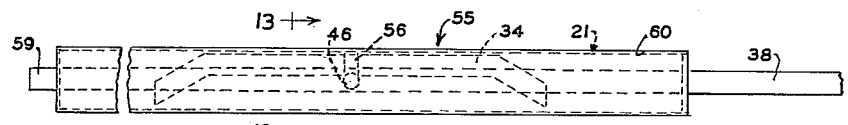
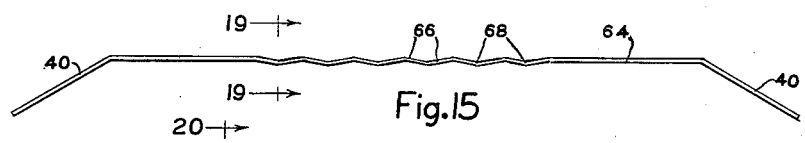
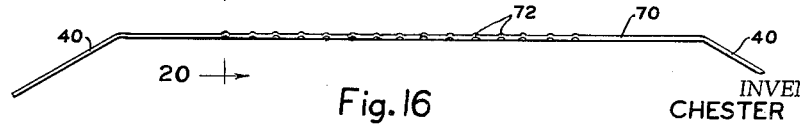
INVENTOR.
CHESTER RICK
BY Robert Irving Williams
ATTORNEY

United States Patent Office 3,209,527
Patented Oct. 5, 1965

3,209,527
SPRING-TINE RAKE
Chester Rick, Peekskill, N.Y., assignor to Iez Foundation, % Chester Rick, Peekskill, N.Y.
Filed Mar. 21, 1963, Ser. No. 267,892
11 Claims. (Cl. 56—400.04)

This invention pertains to spring-tine rakes, and is directed more especially to rakes wherein the tines are easily replaceable, adjustable, and parallel, and to correlated inventions and discoveries appertaining thereto.

The present invention contemplates, among its various aspects, the provision of a rake having spring tines which are readily installed and replaced by the user and whose length and stiffness may be adjusted for the most efficient use, with the tines arranged in a parallel manner so as to avoid lateral stresses and wear, and with their ends in a straight line so that they will all contact a plane surface evenly, irrespective of the angle at which the handle may be held. The invention further contemplates the provision of a rake that is highly effective and efficient in use and is light, strong, durable, and easy and economical to make and repair.

In certain of its aspects, moreover, the invention contemplates the provision of a rake which may be packaged in a space-saving economical manner for shipment and/or sale to users who can then rapidly and easily assemble the rake, and the provision of a special form of package.

Economies in fabrication and shipment which accrue from the unique simplicity of this design, permit the use of a relatively costly aluminum alloy which is rustless, one-third as heavy and 50% stronger than mild steel and at a sales price lower than that of rakes which do not have the advantages here outlined.

The rake may consist of three main elements, the spring tines, a handle, and a yoke by which the tines and handle are united.

The invention accordingly comprises articles of manufacture possessing the features, properties, and the relation of elements which will be exemplified in the articles hereinafter described and the scope of the application of which will be indicated in the claims.

For a fuller understanding of the nature and objects of the invention, reference should be had to the following detailed description taken in connection with the accompanying drawings, in which:

FIGURE 1 is an isometric view of a section of a tine-holding yoke with a fragment of a tine mounted thereon;

FIG. 2 is a fragmentary side view taken on the line 2—2 of FIG. 1, showing the shape and arrangement of a row of apertures in the yoke, as well as tines therein in section;

FIG. 3 is an isometric view of a tine before installation in the yoke;

FIG. 4 is an end view of a yoke showing a tine in process of being assembled therein;

FIG. 5 is an end view with the tines assembled in the yoke;

FIG. 6 is a side view showing portions of the preferred rake handle;

FIG. 7 is a partial bottom view of the end of the handle;

FIG. 8 is a side view showing the yoke affixed to the underside of the end of the rake handle;

FIG. 8A is a transverse section on an enlarged scale taken on the line 8A—8A of FIG. 8;

FIG. 9 is a side view showing the yoke affixed to the upper side of the end of the rake handle and at an angle to the axis thereof and with the longer portion of tines extending from the handle;

FIG. 10 is a view similar to FIG. 9 but with the yoke turned 180 degrees from FIG. 9 with the shorter portion of the tines extending from the handle;

FIG. 11 is a partial side view of a bundle of automatically formed and stacked tines held together by a strap and a screw or pin so that they may be handled as a unit for further assembly and packaging;

FIG. 12 is a sectional view of the bound tines taken on the line 12—12 of FIG. 11;

FIG. 13 is an enlarged end view of the package taken on the line 13—13 of FIG. 14;

FIG. 14 is a top view showing the rake components arranged for shipping in a compact package;

FIG. 15 is a side view of a tine similar to FIG. 3 but modified to include a corrugated intermediate portion;

FIG. 16 is a side view of a tine similar to FIG. 3 but modified to include an intermediate portion having indented edges;

FIG. 17 is an end view of an alternate configuration of a yoke;

FIG. 18 is a view taken from the same point as FIG. 2 and showing the yoke with an alternate aperture construction formed therein;

FIG. 19 is a sectional view on an enlarged scale taken on the line 19—19 of the tine of FIG. 15; and FIG. 20 is a sectional view on an enlarged scale taken on the line 20—20 of the tine of FIG. 16.

Referring now more particularly to the drawings, the rake as seen in FIGS. 1 through 10 includes a yoke 21 formed in the preferred instance of hard, high strength aluminum alloy sheet material. The yoke, as exemplified, has a pair of legs 22, extending upwardly from base portions 24, disposed adjacent to and forming an integral part of a bolster portion 26 intermediate of the legs 22. In each leg there is formed a row of apertures 28 as seen in FIG. 2. The bolster 26 is formed with its apex 30 a distance above the rows of apertures. Each aperture 28, in the preferred instance, is shaped with its sides converging upwardly as by having the sides 32 tapered toward the top of the leg 22, as in the truncated triangle exemplified. There are provided spring tines 34, each having a normal shape, straight in the present instance, as shown in FIG. 3, and each made, in the present embodiment, of $\frac{3}{16}$ inch wide flat spring wire providing at least one substantially flat surface for passing over the bolster. The tines 34 are adapted to engage the inclined sides 32 a short distance from the bottom of the apertures 28, wherein they are wedged firmly by the spring pressure which they exert when deflected from their normal shape, as by being bowed over the bolster. In this manner the tines are prevented from moving longitudinally, and stresses imposed upon the tines in use only tend to wedge them more tightly in the apertures.

The apertures 28 are, in the present instance, spaced on one-half inch centers, with a row of forty-eight apertures formed in each leg in the most commonly used size. However, the apertures may be differently spaced so that the tines may be spaced as desired for special uses. In the preferred instance, the tines are placed in alternate apertures except that, as the tines in the end apertures are subject to extra strain and breakage, they may be reinforced by the insertion of additional tines. However, for special uses, forty-eight tines might be inserted.

In the exemplified embodiment, a mounting hole 36 for attaching to a handle 38 is formed at the apex 30 in the bolster 26 and centrally of the legs 22; and, in the present instance, is intermediate the location of two pairs of apertures, so that those tines 34 which are mounted therein will tend to bear on the sides of the handle and will help to hold the yoke in proper position, as shown in FIG. 8A. As a practical matter the hole 36 is central between the ends of the yoke 21.

The exemplified tines 34 are made of spring tempered aluminum alloy approximately one foot long with their outer ends bent as at 40. This bent end is designed to bring the tine ends more perpendicular to the ground when in use and to insure that the ends of the tines while being assembled into the yoke (FIG. 4) will pass at least ¾ inch beyond the far side of the yoke freely, without bending of tine 34. Assembly of tines 34 in the yoke 21 is easily accomplished by inserting one end of a tine through an aperture 28 in one leg, over the apex 30 of the bolster, and then through the oppositely aligned aperture in the other leg 22. As illustrated in FIG. 5, the ends of the tines are bent downward with the fingers of two hands in the direction of the base portions 24, against which two thumbs bear upward, the tines 34 assuming a position as shown in the phantom outline and in this position being free to slide lengthwise across the bolster 30 and through the apertures 28. After the tines are brought to the position desired, they are released and the upward spring action against the inclined sides of the aperture causes the tines to wedge, secure against any lengthwise movement. The upward thrust of the tines at leg 22 is double that of the finger pressure at twice the distance from apex 30 and this thrust is further increased about five times in the engaging pressure of the tines against the inclined edges of the aperture. There may thus be provided an overall mechanical advantage of ten or more to one, depending upon the angle of the aperture edges, and quite adequate for secure engagement. The assembly will then appear as shown in the solid outline of FIG. 5. Each tine is in turn inserted and aligned in this manner so as to complete the assembly of the rake head. By attaching the tines at or near their center they are subject to less leverage and stress, making them much more durable than if attached at one end as has been customary. Also, the tines mounted as in FIG. 5 yield less and function more effectively under a heavy load, and when worn on one end the yoke can be turned 180° to bring the good ends of the tines into use, all of which combines to more than double the life of the tines. The tines may be installed with unequal projections, as in the present instance, with short stiff projection of approximately 5¼ inches from the tip of the tine to a theoretrical apex center 30 and a long more limber projection of approximately 6¾ inches from tine tip to center 30.

The handle 38 (FIGS. 6 and 7) preferably made of hard wood and, in the present embodiment, made of rectangular stock 1⅜ inch (so as to fit between ⅜ inch tines on 1 inch centers) by one inch in size and with rounded corners, has one end formed for the mounting of the yoke 21 with the installed tines. To mount the top of the yoke parallel to the handle (FIG. 8) the end of the handle has formed on the underside a pair of shallow notches 42 at right angles to the axis of the handle and a circular lateral recess 44 adapted to receive the curved top of bolster 26. A machine screw 46 is inserted through hole 36 in yoke 21 and through hole 48 in the handle 38 and by means of a nut 50, the yoke 21, preassembled with tines, constitutes the rake head, which as a unit is removably attached to the handle.

The yoke or rake head may be mounted at an angle to the upper side of handle end which is formed with an angled cut "A" (as shown 15 degrees). On this angled surface 52 and disposed on each side of the screw hole 48 are two circular recesses 54 at right angles to the axis of the handle. These recesses 54 are spaced and shaped so as to mate with the base portions 24 of the yoke. The mount yoke 21 on handle 38, as in FIG. 9, the base elements 24 are placed in recesses 54 and screw 46 is inserted through hole 36 in yoke 21 and through hole 48 in handle 38. Nut 50 is mounted on screw 46 and tightened against handle 38.

The rake as shown in FIGS. 8 and 9 has the yoke 21 mounted on the handle with the longer and more limber portion of the tines 34 extending beyond the end of the handle. Should the user of the rake desired it to be stiffer and less yielding, he need only loosen screw 46, turn yoke 21 end for end and retighten on the handle with screw 40 and nut 50 (FIG. 10).

A preferred packaging of the rake for marketing is shown in FIGS. 11 through 14 wherein a space-saving arrangement of rake components also provides an economical damage-resistant package 55. Three dozen such rakes of any length of yoke and as packaged in the exemplified manner have a girth of less than forty inches which when added to the contemplated sixty inch length of handles provides a package within the one-hundred inch parcel post limit. Tines 34 may be automatically formed, counted, and placed with their flat surfaces contiguous, with ends and sides aligned, and then by means of a clamp band 56 and a pin (in this case screw 46) are retained in a compact bundle (FIGS. 11 and 12). The bundle of tines held by the screw and band are placed adjacent to yoke 21 (FIG. 13) and this adjacent to the handle 38, with the screw extending through clamp band 56, hole 36, and hole 58 in the handle and retained by nut 50. A cardboard sleeve 60, a little longer than yoke 21 and preferably having a generally trapezoidal shape and providing a snug fit on the components, is slid over the assemblage binding the parts together and forming the package shown in FIG. 14. It is to be noted that hole 58 in handle 38 is so located that a small portion 59 of the handle will project from the sleeve 60 so as to protect the package in shipment.

The terms "upwardly," "top," "above," and other terms referring to a vertical direction as used herein refer to a situation wherein the base of the yoke is horizontal, rather than to positions in which the rake would ordinarily be used.

A user who may receive a rake in a package 55 as shown in FIGS. 13 and 14 may remove and discard sleeve 60 and disassemble all parts. The tines 34 are then inserted into apertures 28 in the yoke in the manner described above and as shown in FIGS. 4 and 5, the amount of extension of the respective ends of the tines from yoke 21 being selected by the user. The rake is then assembled as described above and as shown in one of the FIGS. 8, 9 and 10. The rake may then be used in the manner common to spring tine rakes. Replacement of a tine 34 or alternation of the tine length is easily accomplished by the user as will be understood from the desription in connection with FIG. 4. Replacement of any component of the rake is easily and economically accomplished, obviating the necessity of scrapping of the rake because of damage to tines, yoke, or handle.

An alternate form of tine is shown in FIGS. 15 and 19 wherein a tine 64 is formed with a longitudinally intermediate portion having shallow corrugations providing sloped portions 66 with valleys 68 at the junctures thereof, the corrugations being equally spaced so that a preselected number will equal the distance between oppositely disposed apertures in legs 22. Tine 64 when inserted in the apertures is moved in the manner described above and so that the valleys 68 will engage the sides 32 of the apertures when released as above. This valley engagement with the aperture sides 32 increases the ability of the tines to resist movement in the apertures and also aids in placing the tines with uniformity.

An alternate to the corrugated tine 64 is a tine 70 wherein the intermediate portion has spaced indentations 72 formed along the two edges of the tine. These indentations are spaced so as to engage the sides 32 of the apertures in a similar manner as that described above.

An alternate form of yoke is shown in FIG. 17 wherein a leg portion 76 extends directly upwardly from curved base portions 78 which are adjacent to and form an integral part of a bolster 80 intermediate the legs 76.

An alternate form of aperture construction is illustrated in FIG. 18 in which round holes 82 are formed in the legs 22 or legs 76. The size of the holes are such that tines 34, 64 or 70 will engage and wedge above but near the central portions of apertures 82, for example, approximately three-sixteenth inch from the top of the leg 22 or 76.

Since certain changes may be made in the above article and different embodiments of the invention could be made without departing from the scope thereof, it is intended that all matter contained in the above description or shown in the accompanying drawings shall be interpreted as illustrative and not in a limiting sense.

I claim:

1. A spring-tine rake comprising a yoke, a pair of elongated base portions formed integrally side by side on said yoke, an integrally formed leg extending upwardly from each of said base portions, a row of apertures in each of said legs, a unitary bolster extending upwardly and formed integrally with both of said base portions, the top of said bolster being located a greater distance than said apertures from said base portions, a plurality of spring tines each formed with a bent end portion, each tine extending through an aperture in each of said legs and maintained in bowed position solely by the top of said bolster and the side of said apertures, a handle having formed on one side of an end thereof a bolster-receiving seat with the bolster seated therein, a hole extending through said seat and said handle and means extending through said hole for detachably mounting said yoke to said handle.

2. A rake according to claim 1 wherein said handle end has on the side opposite said bolster receiving seat an angled surface and base-receiving recesses therein, the recesses being disposed on each side of the hole.

3. A spring-tine rake comprising a yoke, a pair of elongated bases integrally formed side by side on said yoke, an integrally formed leg on each of said bases extending upwardly from said base, a row of spaced apertures in each of said legs, a unitary bolster formed integrally with said bases intermediate said legs and extending upwardly from said bases, a plurality of spring tines extending through said apertures and over said bolster, said spring tines being deflected from their normal position solely by the combination of said bolster and said apertures in an amount sufficient for the spring bias of said tines to maintain them in position, a handle having a portion with a width adapted to snugly fit between the edges of a pair of adjacently inserted tines to assist in holding the yoke in position on the handle, and means securing the yoke to the handle with said portion of the handle fitting between the adjacent edges of a pair of tines.

4. A rake head comprising a yoke, a pair of spaced-apart elongated bases formed integrally on said yoke, a leg integrally formed on each of said bases and extending upwardly therefrom, a row of spaced-apart apertures on each of said legs, a bolster formed integrally with both of said bases and extending upwardly from said bases and between said legs, the top of said bolster extending further upwardly than said rows of apertures from the respective bases, and a plurality of spring tines each extending through an aperture in each leg and over the top of said bolster, each tine being deflected from its normal position solely by the combination of the top of said bolster and its respective apertures by an amount sufficient for the resulting spring tension of the tine to hold it secured to said yoke.

5. A rake head according to claim 4 wherein at least those portions of each tine which engage said apertures are formed with transverse corrugations.

6. A rake head according to claim 4 wherein those portions of each tine which engage said apertures are formed with indentations in the edges thereof.

7. A rake head comprising a yoke, a pair of spaced apart elongated bases formed integrally on said yoke, a leg formed integrally with each of said bases and extending upwardly therefrom, a row of spaced apart apertures in each of said legs, a bolster formed integrally with both of said bases intermediate said legs and extending upwardly from said bases, and a plurality of spring tines, each of said tines extending through an aperture in each leg and over said bolster, the top of said bolster being located in relation to said apertures as to operate solely as a combination with said apertures to flex said tines from their normal form prior to their insertion through said apertures to produce sufficient spring tension in said tines by which tension said tines are maintained in engagement with the edges of said apertures and the top of said bolster.

8. A rake head according to claim 7 wherein one end portion of each of said tines is bent transversely at an angle.

9. A rake head according to claim 7 wherein both end portions of each of said tines are bent transversely at an angle.

10. A rake according to claim 7 wherein two opposite sides of each of said apertures are inclined towards each other to provide a wedging action of the respective flexed tine in said aperture.

11. A rake head according to claim 7 wherein said apertures are generally circular in shape.

References Cited by the Examiner

UNITED STATES PATENTS

| | | | |
|---|---|---|---|
| Re.17,810 | 9/30 | Bell et al. | 56—400.17 |
| 1,263,255 | 4/18 | Kohler | 56—400.16 |
| 1,933,636 | 11/33 | Montan | 56—400.7 |
| 1,980,252 | 11/34 | Bergmann | 56—400.18 |
| 2,315,021 | 3/43 | Schmidt et al. | 56—400.17 |
| 2,463,393 | 3/49 | Key | 56—400.17 |
| 2,490,710 | 12/49 | Rugg | 56—400.17 |
| 3,029,933 | 4/62 | Sutter | 206—46 |
| 3,067,866 | 12/62 | Burton | 206—46 |

ANTONIO F. GUIDA, *Acting Primary Examiner.*

CARL W. ROBINSON, RUSSELL R. KINSEY, T. GRAHAM CRAVER, *Examiners.*